July 10, 1962   G. M. ADIE   3,043,730
FOAMED CONSTRUCTION ELEMENT
Filed Sept. 3, 1958
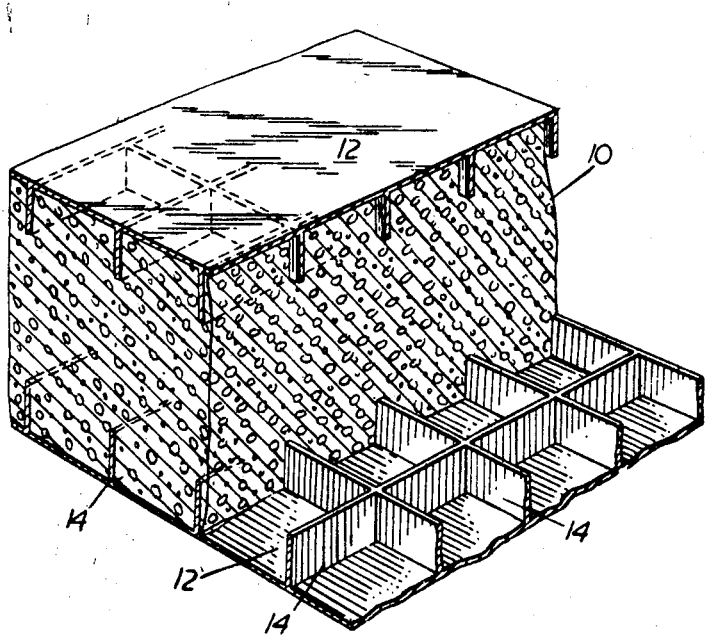

United States Patent Office 3,043,730
Patented July 10, 1962

3,043,730
FOAMED CONSTRUCTION ELEMENT
George Mountford Adie, London, England, assignor to The Dow Chemical Company, Midland, Mich.
Filed Sept. 3, 1958, Ser. No. 758,725
Claims priority, application Great Britain Sept. 3, 1957
11 Claims. (Cl. 154—45.9)

This invention relates to materials for use in the construction of buildings.

There are today available various light-weight products produced in slab, board or panel form which are very useful as filling materials in partitions and the like. In particular, there are the so-called "foamed" plastics which consist of a plastic such, for example, as polystyrene, in a cellular or aerated form of great bulk in comparison with its weight. Such products have sound and heat insulating properties which, together with their low specific gravity make their use very attractive. On the other hand, the tensile and compressive strengths of such products are necessarily low and they are particularly easily damaged by concentrated loads.

The invention is concerned with the production of a composite article comprising such a light weight product and a reinforcement which not only increases its mechanical strength but also provides it with a non-porous surface.

According to the invention, a slab, board or panel of porous or cellular material of a plastic or other mouldable nature is faced on at least one side with a protective and reinforcing skin which is anchored to it by means of thin ribs projecting from the skin and embedded in the cellular material.

The skin is preferably formed of a plastic of high mechanical strength such, for example, as polystyrene but of such a small thickness ($\frac{1}{32}$ inch or less) that it has little inherent rigidity. On the other hand, the ribs by means of which it is keyed to the cellular material are of such a depth and are so arranged as to impart to it a substantial resistance to deformation.

The ribs, however, need not be thin over the whole of their depth. For example, the ribs may define substantially hemispherical cavities or cells.

A typical product in accordance with the invention, suitable for use as a partitioning material is shown in the accompanying drawing. This consists of a panel or slab 10 of a cellular material such as foamed polystyrene about 2 inches thick, faced on each side with a skin 12 of a plastic such as polyvinyl chloride $\frac{1}{32}$ inch or less thick, each skin being keyed to the panel by ribs 14 $\frac{1}{50}$ inch or less thick and at least $\frac{1}{4}$ inch and preferably about $\frac{3}{8}$ inch deep, projecting from the rear face of the skin and embedded in the material of the slab.

The ribs preferably run in at least two different directions but not necessarily at right angles to each other as shown. They should preferably provide a sufficiently great surface area to ensure such a degree of keying as makes it unnecessary to rely on any substantial adhesion between the slab and the inner face of the skin for the bonding of the slab and the skin.

The manner in which the ribs are caused to key in the panel depends on the nature of the material of the slab. In some cases, it is sufficient to press the ribs into the slab, the material of the slab being relatively easily penetrable and having sufficient plasticity to grip the ribs and prevent their removal except by the application of considerable force. In general, however, a more positive fixing is desirable. To that end the slab can be provided with slits for the reception of the ribs, which, by being treated with a solvent or adhesive before insertion into the slits, can be made to adhere very firmly or even be welded to the material of the slab.

Suitable slits can be formed in a variety of ways, for example by a pressing or shearing operation with a blade or hot wires which may be electrically heated.

Where it is a question of producing partitioning material, the cellular slab will generally be faced on both sides as shown in the drawing. Where, however, it is a question of producing a lining material for floors, walls or ceilings, the slab need be faced only on one side.

Particularly in the case of floors, the cellular material can advantageously be resiliently compressible such as foamed rubber.

The cellular materials with which the invention is concerned are generally produced in large slabs. The reinforcing skin which is applied in accordance with the invention can be used in the form of equally large sheets suitably provided with keying ribs or in the form of smaller panels or tiles.

The skin is not necessarily of a plastic material; it may, for example, be a sheet or foil of metal. Nor need the ribs necessarily be of a plastic material nor of the same material as the skin. The essential features of the ribs are that they must be of a material which is or can be made adherent to the cellular material in which they are embedded and have a sufficiently great surface area, having regard to their adhesive quality, to ensure adequate keying.

Foamed polystyrene and foamed rubber have been mentioned as examples of suitable cellular materials. The invention, however, can be used with any foamed plastic and, generally, with any porous or cellular material of a mouldable nature. More generally still, the material used need not be a plastic and it can be naturally cellular or have been made cellular by any process whatever.

A compressive force applied to one face of a slab, panel, beam or the like appears at the other face as a tensile force. In a structural member in accordance with the invention, the plastic or metal skin even if of very little thickness and having little, if any, inherent rigidity has a higher tensile strength than the cellular filling and therefore, contributes substantially to the strength of the member without substantially increasing its thickness.

I claim:

1. A constructional element consisting of a body of foamed material selected from the group consisting of plastics and rubber and a protective facing skin of higher tensile strength than the foamed body material and attached to at least one side of the body, said skin having thin, flat ribs projecting from one face and extending in at least two directions across the skin to form a grid, said ribs being all embedded in the foamed body material to anchor the skin to the body, said ribs having such a depth and said body having such a thickness and rigidity that the ribs remain embedded in the body material and do not pass therethrough when a normal compressive force is applied to the skin, whereby said body transmits loads from one side to the other.

2. A constructional element according to claim 1 in which the skin is of a plastic.

3. A constructional element according to claim 2 in which the skin is formed of a thermo-plastic material.

4. A constructional element according to claim 1 in which the skin is a sheet of metal.

5. A constructional element according to claim 1 in which the skin is so thin as to have substantially no rigidity.

6. A constructional element according to claim 5 in which the skin has a thickness of not more than $\frac{1}{32}$ inch.

7. A constructional element according to claim 1 in which the ribs have a thickness of not more than $\frac{1}{50}$ inch and a depth of at least $\frac{1}{4}$ inch.

8. A constructional element according to claim 1 in which the skin is maintained in position solely by the adhesion of the ribs with the foamed material in which they are embedded.

9. A constructional element according to claim 1 in which the foamed material is a foamed thermo-plastic material.

10. A constructional element according to claim 1 in which the foamed material is resilient.

11. A constructional element consisting of a foamed plastic mass of relatively low resistance to penetration by a concentrated load and faced on each side with a thin facing sheet having a greater resistance to penetration than said mass, said sheets being anchored to said mass by means of thin, flat ribs projecting from one side of each of said sheets, the ribs on each sheet extending in at least two directions across the skin and intersecting with one another, said ribs being all embedded in the foamed plastic mass, said ribs having such a depth and said mass having such a thickness and rigidity that the ribs on one of said facing sheets do not pass through the body or abut the ribs on the other one of said facing sheets when a normal force is applied to the element.

References Cited in the file of this patent

UNITED STATES PATENTS

| | | |
|---|---|---|
| 1,586,219 | Roppert | May 25, 1926 |
| 2,106,943 | Fischer | Feb. 1, 1938 |
| 2,493,032 | Rheinfrank | Jan. 3, 1950 |
| 2,626,886 | Scholl | Jan. 27, 1953 |
| 2,682,111 | Kish | June 29, 1954 |
| 2,688,152 | Marco | Sept. 7, 1954 |
| 2,744,042 | Pace | May 1, 1956 |

FOREIGN PATENTS

| | | |
|---|---|---|
| 577,705 | Great Britain | May 29, 1946 |

OTHER REFERENCES

Ser. No. 212,074, C. Dornier (A.P.C.), published May 11, 1943.